United States Patent
Ioramashvili et al.

(10) Patent No.: US 11,585,527 B2
(45) Date of Patent: Feb. 21, 2023

(54) GEOTHERMAL ENERGY DEVICE

(71) Applicants: Solomon Ioramashvili, Tblisi (GE); Shalva Kochladze, Tblisi (GE); Enriko Beridze, Tblisi (GE)

(72) Inventors: Solomon Ioramashvili, Tbilisi (GE); Shalva Kochladze, Tbilisi (GE); David Jincharadze, Tbilisi (GE)

(73) Assignees: Enriko Beridze, Tbilisi (GE); Solomon Ioramashvili, Tbilisi (GE); Shalva Kochladze, Tbilisi (GE)

( * ) Notice: Subject to any disclaimer, the term of this patent is extended or adjusted under 35 U.S.C. 154(b) by 274 days.

(21) Appl. No.: 16/967,819

(22) PCT Filed: Jan. 25, 2019

(86) PCT No.: PCT/GE2019/050001
§ 371 (c)(1),
(2) Date: Aug. 6, 2020

(87) PCT Pub. No.: WO2019/155240
PCT Pub. Date: Aug. 15, 2019

(65) Prior Publication Data
US 2022/0049846 A1     Feb. 17, 2022

(30) Foreign Application Priority Data
Feb. 6, 2018  (GE) .......................... AP 2018 14694

(51) Int. Cl.
*F22B 1/16*       (2006.01)
*F24T 10/13*     (2018.01)
(Continued)

(52) U.S. Cl.
CPC ................. *F22B 1/16* (2013.01); *F01K 7/16* (2013.01); *F01K 11/02* (2013.01); *F01K 19/08* (2013.01); *F22B 3/045* (2013.01); *F24T 10/13* (2018.05)

(58) Field of Classification Search
CPC ................................................. F24T 10/10–17
(Continued)

(56) References Cited

U.S. PATENT DOCUMENTS

| | | | |
|---|---|---|---|
| 2009/0126923 A1* | 5/2009 | Montgomery | F24T 10/30 166/57 |
| 2009/0277152 A1* | 11/2009 | Sutherland | F02C 3/055 60/39.63 |

(Continued)

*Primary Examiner* — Mickey H France
(74) *Attorney, Agent, or Firm* — Mark M. Friedman

(57) ABSTRACT

The technical outcome of the proposed geothermal energy device is to increase its efficiency (CE), to simplify and cheapen the construction. The geothermal energy device contains downstream and upstream pipes, which are filled with fluid thermal agent and placed in the borehole, which is unilaterally closed from the ground surface; the pipes are connected to each other with a heat exchanger in the depth of the borehole. The downstream pipe is equipped with several mechanical non-return valves; on the same pipe there is also installed a down pushing pump of the thermal agent (e.g. isobutane). The end of the upstream pipe on the ground surface is directed towards the condensation type steam turbine, equipped with the controlled (e.g. electromagnetic) valve, and turned towards the mentioned turbine by the Laval nozzle. The energy device additionally contains the device of the frequency/duration control to lock and unlock the mentioned controlled valve.

5 Claims, 1 Drawing Sheet

Figure 1:
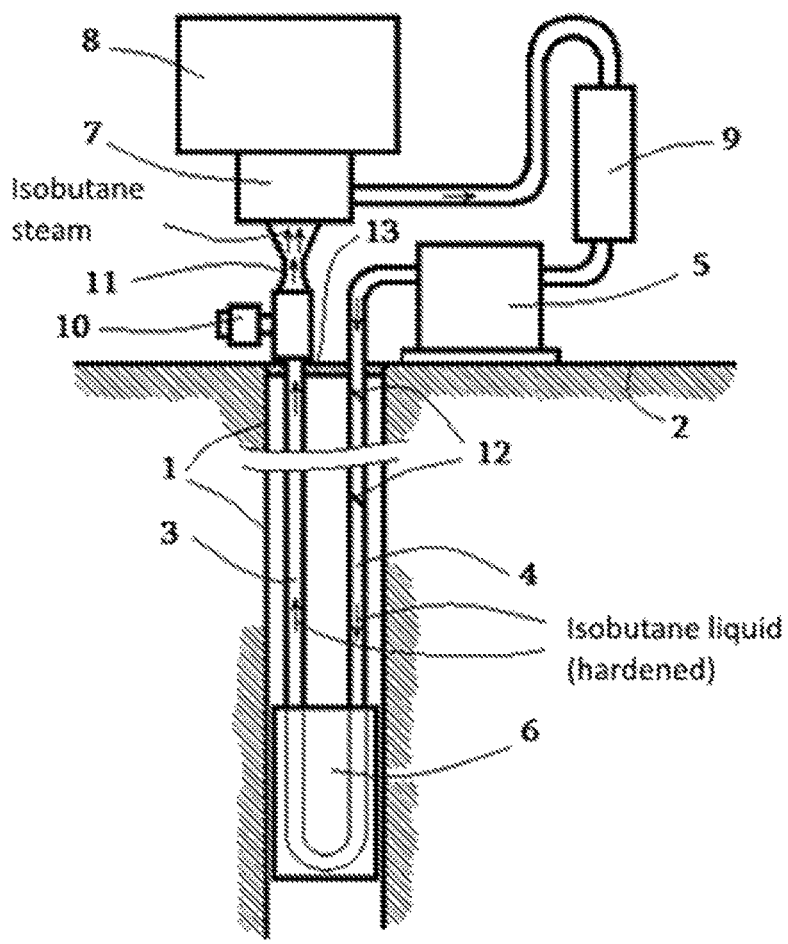

(51) Int. Cl.
*F01K 7/16* (2006.01)
*F01K 11/02* (2006.01)
*F01K 19/08* (2006.01)
*F22B 3/04* (2006.01)

(58) Field of Classification Search
USPC .............................................. 60/641.2–641.5
See application file for complete search history.

(56) References Cited

U.S. PATENT DOCUMENTS

| | | | | |
|---|---|---|---|---|
| 2010/0011766 | A1* | 1/2010 | Grundl | F02G 5/02 |
| | | | | 60/614 |
| 2012/0312545 | A1* | 12/2012 | Suryanarayana | F24T 10/30 |
| | | | | 166/369 |
| 2013/0333383 | A1* | 12/2013 | Schwarck | F24T 10/17 |
| | | | | 60/641.2 |
| 2015/0330670 | A1* | 11/2015 | Wynn, Jr. | F24T 10/00 |
| | | | | 165/45 |
| 2019/0055898 | A1* | 2/2019 | Roskilly | F01B 11/00 |
| 2020/0263568 | A1* | 8/2020 | Copeland | F01K 21/045 |

* cited by examiner

GEOTHERMAL ENERGY DEVICE

FIELD OF THE INVENTION

The invention refers to the geothermal energy device with a binary, forced convection cycle, for generating various kinds of energy, including electrical energy. Its technical outcome is to increase the coefficient of efficiency (CE), to simplify the construction and lower the costs.

BACKGROUND OF THE INVENTION

A binary cycle is a thermodynamic cycle using two working fluids, one of which is characterized with low saturation pressure in the conditions of a high temperature, and the other—with a low evaporation temperature. In our case, one working fluid in the depths of the ground, in the borehole, is naturally existing hot water (or a hot gas in the same but arid space), and the other body—is the thermal agent, e.g. isobutene, which is pumped under high pressure and placed in the closed circuit of the upward and downward pipes. As for the essence of the cycle, its function is to take the geothermal energy from the depths of the ground to the surface for its further direct use and/or transformation in mechanical and/or electrical energy. The process of energy movement to the surface is conducted by means of the thermal exchange between the working fluids.

The geothermal energy is energy from the Earth's natural heat. It is widely known that this heat can be used by means of a borehole. The geothermal gradient (a temperature change according to the depth) in the bore is average 2.5-3° C. for each 100 meters. This heat comes out onto the ground surface as steam or hot water. Such heat can be used directly for heating houses and buildings and/or generating energy. There are three types of geothermal power plants: dry steam, hot water steam and binary cycle plants.

Despite the fact that geothermal power plants have many advantages (the generated energy is renewable, 24/7, "green," it does not require any kind of additional costs, but the some prevention and maintenance charges etc.), they are still characterized by a few disadvantages that impede a widespread usage of these types of power plants.

In general, the main disadvantage of all three types of geothermal power plants is that they need water cycle (as a rule, used supply (filling) to be renewed in the underground water horizon. For this purpose, an additional borehole and appropriate infrastructure is needed. This significantly reduces the cost-effectiveness of such power plants. There are frequent occasions when excessive injection in the ground crust of used water also causes the power plant to stop.

The drawback of geothermal power plants is the release of inflammable and/or toxic gases and minerals from the exploitation tunnel onto the ground surface. This in turn leads to additional costs for their utilization and neutralization.

The main problem (and especially for binary cycle geothermal power plants) is the necessity of large-scale surface infrastructure and thus, reduction of land resources. This is especially important for land-starved countries. In binary cycle geothermal power plants this infrastructure provides an efficient heat exchange between the thermal water resource coming out onto the ground surface and the heat agent (working fluid). The larger the ground surface infrastructure, the larger is the volume of the heat agent, and, consequently, the more powerful is the capacity of the power plant. However, except for the restrictions on the use of the land resources for the power plant infrastructure, there are other problems: the volume of the thermal agent is limited with the flow of rising thermal water and with the temperature of this resource on the surface. For this reason, a significant increase in the amount of heat agent, even if aboveground infrastructure difficulties are overcome, cannot guarantee the raise capacity of the power plant. The geothermal resources on Earth are quite numerous and the majority of the characteristics are that binary cycle power plants will work successfully, however, due to these problems, geothermal energy development is not capable of its potential.

The binary cycle geothermal power plant is a kind of a geothermal power plant that generates electricity from relatively cool geothermal reservoirs (unlike dry steam and hot water steam power plants that generate electricity by directing dry steam (150° C. and higher temperature) and hot water vapor (180° C. and higher temperature) to the turbine. Since water temperature on the ground surface is not sufficiently high at binary cycle geothermal power plants, in order to get water vapor (it is less than 100° C. in most geothermal sources), the thermal water from the surface of the ground is pumped into the so-called heat exchanger, where the latter transfers the heat to the second (binary) thermal agent. Under the conditions of standard atmospheric pressure, boiling temperature of the thermal agent is significantly lower than that of water (now the used binary heat agent is, for example, isobutene or a mixture of isobutene and isopentane). The binary thermal agent, which generates energy during from a fluid to a gas phase transition, is directed towards the turbine of such power plants. Binary thermal agent is in a closed circuit. From the turbine, the thermal agent steam returns to the fluid condensate and is pumped into the heat exchanger to start a new cycle. As for the used geothermal water—it is pumped into the water-containing rocks through the downward borehole.

There is also known a geothermal power plant, which takes heat from the geothermal ore by means of two upward and downward pipes fitted into two bore-holes; they are connected to each other through a heat exchanger, so that the fluid through the downward pipe moves to the upward one, at the same time, the pump is installed on the downward pipe on the ground surface and the turbine is on the upward pipe. WO2015132404 A1).

There is also known a double method and device of the geothermal energy take off, that envisages an arrangement of a borehole with two, upward and downward pipes. In each borehole, two different circuit pipes are placed which are connected to the water system, that passes the soil (see U.S. Pat. No. 3,975,912 A).

There is also known a heat take off system from the geothermal ore and a geothermal power plant which contains two upward and downward pipes discharged from the ground surface; they are connected with each other by means of the thermo cylinder, so that fluid turned into steam from the downward pipe passes through the thermo cylinder and into the upward pipe. On the ground surface there is installed a device which takes off heat from the working liquid and transfers it into the thermal power (see WO2012114297 A2).

The closest to the presented invention with its essential signs is a geothermal heat exchange system, containing upward and downward pipes lowered from the ground surface into one borehole; they are connected to each other by the boiler (heat exchanger) so that the fluid from the downward pipe through the boiler passes into the upward pipe. On the ground surface, the pump is placed on the downward pipe in order to pump fluid into the pipe, and the turbine is attached to the upward pipe, which is also connected to the heat exchangers, for taking off heat and condensing from the used steam. Consequently, the condensate (fluid) is again passed to the pump (see U.S. Pat. No. 3,470,943).

All the specified devices and methods have more or less drawbacks which were described above.

AIM OF THE INVENTION

The objective and technical outcome of the presented invention is to increase the efficiency (CE) of the geothermal energy plant, to simplify the construction and reduce the costs.

DISCLOSURE OF THE INVENTION

The technical result is achieved by the fact that the stated geothermal energy device contains at least two, upward and downward pipes filled with fluid thermal agent and discharged from the surface of the ground in a closed from ground surface borehole; they are connected to each other with a heat exchanger in the depth of the borehole. In addition, the downward pipe is equipped with one or several sequential mechanical, down pushing (one-way) valves; on the ground surface a pump is mounted on it which pumps down the thermal agent (its steam condensate). The end of the upward pipe on the ground surface is directed to the steam turbine. The energy device also includes a pipe which transfers thermal agent steam and its condensate from turbine to the mentioned pump.

According to the invention formula, it has the following distinguishing features:

- The end of the upward pipe is equipped with a controlled valve, but the energy device additionally contains a device that controls the lock-unlock duration/frequency of the mentioned valve;
- The steam of the thermal agent rejected from the controlled valve is directed to the turbine through the nozzle;
- The mentioned nozzle is performed as "Laval nozzle;"
- The end of the upward pipe is equipped with an electromagnetic or electromechanical controlled valve;
- The end of the upward pipe is directed towards the condensation type steam turbine;
- As a thermal agent, a low-temperature evaporative substance is used, eg. isobutane, or a mixture of isobutane and isoprene;
- The borehole is unilaterally closed only from the ground surface.

EMBODIMENTS OF THE INVENTION

Figure 2:
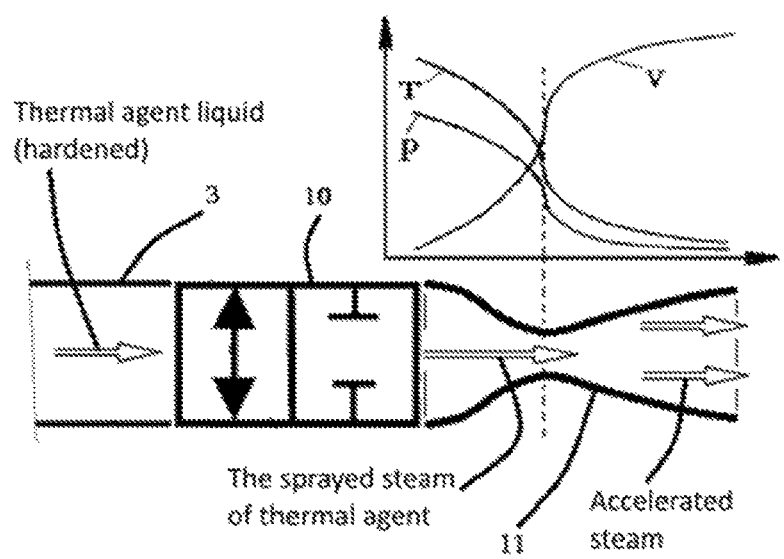

The essence of the invention is set out in drawings on which are presented:

FIG. 1—Principle scheme for the geothermal energy device performance;

FIG. 2—The thermal agent is directed toward the steam turbine; the change diagram of the thermal agent's steam temperature, pressure and velocity, as well as the layout of the controlled valve.

The presented geothermal energy device contains upward (3) and downward (4) pipes fit as a continuous (joined) circuit from the ground surface (2) into the borehole (1). On the downward pipe, on the ground surface, the pump (5) is installed. The upward and downward pipes in the depth of the borehole are connected to the heat exchanger (6). The end of the upward pipe on the ground surface is directed to the condensation type steam turbine (7), which is connected to the electric generator (8). The power device contains an exhaust steam condenser (9) from a steam turbine, as well as the pipe for resupply of condensate to the pump. The end of the upward pipe is equipped with a controlled valve (10) with its control (including possibly computer) device (not shown on the figures). The controlled valve can be of different types, including electromagnetic or electromechanical types and can have the ability to be controlled with a lock-unlock duration/frequency regulation. Between the said controlled valve and the steam turbine, the steam nozzle is placed (11), which is performed as a "Laval nozzle." The downward pipe is equipped with a few (at least one) non-return valve (12) that allows the thermal agent pumped into the pipe to flow only in one direction (to the heat exchanger). To prevent the loss of thermal water or/and atomization of associated harmful gases into the atmosphere, the borehole is closed with a protective lid (13)

The geothermal energy device operates as follows:

Initially, in the locked position of the controlled valve (10), the downward (4) and upward (3) pipes are filled with the thermal agent-isobutane. This is done by the pump (5). As a result of pumping, isobutane in the pipes is led to fluid condition and maximum volume of isobutane is pumped into the system. The geothermal energy in the depth of the borehole causes the increase of temperature of fluid isobutane in the pipes (3,4) and heat exchanger (6) (however, despite the temperature increase, the heat agent does not evaporate in the conditions of high pressure). After reaching certain "working" indicators of pressure and temperature (the "working" indicators depend on the configuration of the energy device, the depth of the location of the heat exchanger, the characteristics of the geothermal source, etc.), we open the controlled valve (10). As a result, we switch on the energy supply. On every opening of the controlled valve, the fluid isobutane steam is atomized from the end of the upward pipe (which has both potential as well as kinetic energy); it atomizes in the nozzle (11) and goes to the steam turbine (7). From the controlled valve (10) into the transition zone of Laval nozzle (11), the temperature of the thermal agent "T" and pressure "P" sharply fall, its condition (fluid to gas) changes and the velocity "V" of its steam increases in the acceleration zone of Laval nozzle. Consequently, the kinetic energy of the thermal agent significantly increases (proportionally to the speed square), which causes the effective operation of the steam turbine (7)-rotation. The turbine rotation is transferred to the generator (8) and electricity is generated. From the condensate type turbine (7) the thermal agent's exhausted steam passes the condensator (9), returns to the fluid condition and fluid is resumed in the downward pipe by means of the pump (5). The duration/frequency of lock-unlock of the controlled valve (10) in the mentioned process is regulated (mechanically or automatically, e.g. by means of a computer) so that duration/frequency of its lock-unlock will be in conformity with the parameters of components of the energy device (the volume of the upward and downward pipes and heat exchanger, consequently the thermal agent volume in the system; the pump mode and capacity; characteristics of the geothermal source; nozzle configuration, and so on) in order to reach the possible maximum of the thermal agent's kinetic energy "fallen" on the turbine. By adjusting this valve, an optimal mode and installment of the geothermal energy device is empirically achieved for a maximum effect (although theoretical calculation of such a mode is quite possible). Such regulated energy device is likely to be "calibrated" only after periodical repair or other maintenance works.

In the distinguishing part of the Claims there are given essential features and achieved results which have the following cause-result connection:

In the geothermal energy device (e.g. in the power plant) of the compulsory convective cycle heat exchange occurs inside the geothermal borehole, in the depth of ground (see FIG. 1) instead of the ground surface. For this purpose, it is possible to use both existing hydrothermal (hot water) boreholes (1), as well as petro thermal (so-called dry, empty, e.g. exhausted oil or natural gas) wells.

In the geothermal (petrothermal or hydrothermal) borehole, which is sealed on the spot where it comes onto the ground surface (13), two pipes are descended from the ground surface (2): downward (4) and upward (3) ones. In the depth of the borehole these two pipes are connected with each other with the heat exchanger (6) so that the movable thermal agent goes by means of the pump (5) into the downward pipe; passing the heat exchanger, it transfers into the ascending pipe. There are several mechanical non-return valves (12) installed on the entire length of the downward pipe, which conduct the thermal agent (in the liquid condition) only in one direction. The heat exchanger, the downward and upward pipes should be made of heat and pressure resistant material. The movable thermal agent (working fluid) is analogous to the working fluid used in the binary cycle geothermal power plants. The above described infrastructure is an underground part of the invention. In order to increase the stimulation of a phase transition of the binary thermal agent, as well as the efficiency of the system, in the aboveground infrastructure the upward pipe joins the turbine, with the so-called "impulsive accelerator" (FIG. 2). which consists of a controlled (e.g. electromagnetic) valve (10) and Laval nozzle (11). The controlled valve works ("it pulsates"-opens and closes) with some frequency. The valve should "pulsate" in such duration/frequency which would ensure a resonant increase of the kinetic energy of the gas from the nozzle (thermal agent steam). It is known that the kinetic energy is directly proportional to the square of the speed $E=0.5\ mv2$. Consequently, a resonant increase of the thermal agent speed will result in resonant increase of the kinetic energy, which, in turn, gives a sharp increase in the power plant's efficiency. As for the resonance frequency itself, it is determined by the frequency of gas vibration (thermal agent, binary working fluid) coming out in the nozzle that in its turn depends on many factors, including: geometry of a nozzle and valve, selected working fluid, difference between pressure (in the upward pipe and turbine cell), working fluid temperature in the upward pipe, geothermal source characteristics, etc.

The fact, that the atomized gas outing of the valve, has a certain frequency of vibration and it is possible to theoretically calculate this frequency, is proved in the following sources:

http://www.transformacni-technologie.cz/en_40.html,
http://www.neftemagnat.ru/enc/

The locked controlled valve (10), pump (5) and mechanical non-return valve(s) (12) of the downward pipe allow the creation of such pressure that the thermal agent remains fluid despite a significant exceed of boiling temperature in the heat exchanger (6) and the upward pipe (3). Consequently, the opening of the controlled valve (10), due to the pressure difference between the upward pipe and the turbine cell (where there is atmospheric pressure) determines the thermal agent's phase transition ("microexplosion" imitation) by creating a shock wave. Resonant increment of the shock wave kinetic energy are described above.

Aboveground infrastructure, except for the heat exchanger camera, "impulsive accelerator" and the accompanying structures, is similar to the existing infrastructure of binary cycle geothermal power plants. Accordingly, on the ground surface (2) there are represented a pump (5)—in order the thermal agent to be pumped into the downward pipe (4), a turbine (7)—attached with the "impulse accelerator" (FIG. 2) onto the upward pipe, a necessary condenser (9)—for cooling the heat agent from the turbine (to transfer it into the fluid condition) and a generator (8)—for the power generation.

Transferring the heat exchanging process underground and adding the impulse accelerator to the turbine cell gives the following advantages:

1) a direct access to non-limited energy source is implemented, which enables the power plant to increase its capacity by increasing the volume of the thermal agent;

2) an arrangement of power plants in the petro thermal boreholes is possible even in the places, where there are no hydrothermal natural resources;

3) there is no need for additional borehole drilling (the most expensive part of the geothermal power plant) in order to pump water into the underground horizons and therefore, the need for the charges to pump the used water into the ground is eliminated;

4) hydrothermal resources are no longer lost;

5) Sulfur hydrogen is no longer atomized into the atmosphere and there is no need to arrange infrastructure in order to utilize toxic and flammable minerals and gases;

6) By economizing the aboveground infrastructure, land resources required for the power plant, are saved;

7) The efficiency of the geothermal power plants increases.

The invention will remove some of the impeding factors to widely use the geothermal energy. Consequently, there will be widely introduced a renewable, non-limited, round-the-clock, ecological geothermal electrical and thermal generation, with consequent economical, ecological and social benefits.

The invention will contribute to a significant increase in the generation of renewable, uninterrupted, round-the-clock, "green", economical electric and thermal energy. Increase the affordability of a corresponding product (electricity and heat) for a wide range of population, as well as, for organization of cost-effective greenhouses and refrigerating farms where it is costly to do.

The invention claimed is:

1. A geothermal energy device comprises a downward and an upward pipe placed in a borehole, unilaterally closed only from the ground surface that are filled with a fluid thermal agent and connected to each other with a heat exchanger in the depth of the borehole, the downward pipe is equipped with at least one, or several sequential mechanical non-return valves, and on the downward pipe on the ground surface there is also installed a down pushing pump for the thermal agent and its steam condensate, and the end of the upward pipe on the ground surface is connected with a steam turbine, which is connected to the pump by means of a pipeline and a steam condenser for condensation and delivery to the pump of exhaust steam passed through the turbine, characterized by that the ending of the upward pipe is connected with the turbine by means of an impulse accelerator consisting of a controlled valve provided to convert the thermal agent from liquid to gaseous phase, a control device which manages the valve open-close duration and frequency in order to oscillate steam of the thermal agent at a resonant frequency, and a turbine-directed nozzle that accelerates steam of the thermal agent that is sprayed through the valve.

2. The geothermal energy device of claim 1, characterized by the nozzle performed as a Laval nozzle.

3. The geothermal energy device of claim 1, characterized by the impulse accelerator valve at the end of the upward pipe is an electromagnetic or electro-mechanical controllable valve.

4. The geothermal energy device of claim 1, characterized by the turbine at the end of the upward pipe is designed as a condensation type steam turbine.

5. The geothermal energy device of claim 1, characterized by a substance with a low evaporation temperature used as the thermal agent, e.g. isobutane, or a mixture of isobutane and isopentane.

\* \* \* \* \*